US012683317B2

(12) United States Patent
Kumagai

(10) Patent No.: US 12,683,317 B2
(45) Date of Patent: Jul. 14, 2026

(54) STRUCTURE, INCLUDING A CONTACT, A HOLDING MEMBER, AND A RETAINING REINFORCEMENT MEMBER

(71) Applicant: Japan Aviation Electronics Industry, Limited, Tokyo (JP)

(72) Inventor: Kenta Kumagai, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 337 days.

(21) Appl. No.: 18/423,514

(22) Filed: Jan. 26, 2024

(65) Prior Publication Data

US 2024/0305032 A1 Sep. 12, 2024

(30) Foreign Application Priority Data

Mar. 8, 2023 (JP) ................................ 2023-035848

(51) Int. Cl.
*H01R 13/432* (2006.01)
*H01R 13/52* (2006.01)

(52) U.S. Cl.
CPC ....... *H01R 13/432* (2013.01); *H01R 13/5202* (2013.01); *H01R 13/5213* (2013.01)

(58) Field of Classification Search
CPC .............. H01R 13/432; H01R 13/5202; H01R 13/5213
USPC .......................................................... 439/271
See application file for complete search history.

(56) References Cited

U.S. PATENT DOCUMENTS 5,944,557 A 8/1999 Fukuda
9,099,803 B2 8/2015 Omori et al.
9,337,568 B2 * 5/2016 Endo .................. H01R 13/5202
9,948,025 B2 * 4/2018 Hashimoto .......... H01R 13/533
9,997,858 B2 * 6/2018 Mogi ..................... H01R 9/223
11,239,600 B2 * 2/2022 Ishikawa ............ H01R 13/5202
(Continued)

FOREIGN PATENT DOCUMENTS

JP 2002-050426 A 2/2002
JP 2002-298969 A 10/2002
(Continued)

OTHER PUBLICATIONS

Extended European Search Report dated Jul. 25, 2024 in European Application No. 24155044.1.

*Primary Examiner* — Gary F Paumen
(74) *Attorney, Agent, or Firm* — Collard & Roe, P.C.

(57) ABSTRACT

A structure comprises a contact, a holding member and a retaining reinforcement member. The contact has an engaged portion. The holding member has a lance, a base portion and a receiving portion. The lance extends in a cantilever manner. The lance has an end in a front-rear direction. The end of the lance is provided with an engaging portion. The base portion is positioned apart from the lance in a perpendicular direction perpendicular to the front-rear direction. The receiving portion is positioned between the lance and the base portion in the perpendicular direction. The retaining reinforcement member is, at least in part, formed of an elastic member. The retaining reinforcement member is inserted into the receiving portion along the front-rear direction. The elastic member is compressed and is in close contact with the base portion or with the lance, and thereby movement of the lance is regulated.

3 Claims, 9 Drawing Sheets

(56) References Cited

U.S. PATENT DOCUMENTS

| | | | |
|---|---|---|---|
| 11,621,517 B2 | 4/2023 | Nakazawa | |
| 2010/0055954 A1 | 3/2010 | Martin et al. | |
| 2018/0062298 A1* | 3/2018 | Mogi | H01R 27/02 |
| 2020/0395706 A1* | 12/2020 | Ishikawa | H01R 13/4364 |
| 2022/0239029 A1* | 7/2022 | Nakai | H01R 13/11 |

FOREIGN PATENT DOCUMENTS

| | | |
|---|---|---|
| JP | 2013-058381 A | 3/2013 |
| JP | 2016-033893 A | 3/2016 |
| WO | 2020/137064 A | 7/2020 |

* cited by examiner

STRUCTURE, INCLUDING A CONTACT, A HOLDING MEMBER, AND A RETAINING REINFORCEMENT MEMBER

CROSS REFERENCE TO RELATED APPLICATIONS

This application is based on and claims priority under 35 U.S.C. § 119 to Japanese Patent Application No. JP2023-035848 filed Mar. 8, 2023, the contents of which are incorporated herein in their entirety by reference.

BACKGROUND OF THE INVENTION

This invention relates to a structure with a configuration which prevents a contact from coming off from the structure.

JPA2016-033893 (Patent Document 1) discloses a structure 900 of this type, or a waterproof connector 900. Referring to FIGS. 17 and 18, the waterproof connector 900 of Patent Document 1 has a female housing 920, conductive terminals 930, or contacts 930, and a front sealing unit 940. The female housing 920 has terminal accommodation spaces 922 and hole portions 924. The terminal accommodation spaces 922 correspond to the hole portions 924, respectively. Each of the terminal accommodation spaces 922 is provided with a lance 9222. The contacts 930 are inserted into the terminal accommodation spaces 922 respectively. Each of the contacts 930 has a lance engagement portion 932. The lance engagement portion 932 is engaged with the lance 9222. The front sealing unit 940 is provided with protruding portions 942. The protruding portions 942 are inserted into the hole portions 924, respectively. A distal end of the protruding portion 942 is positioned beyond the lance 9222 in a positive Z-direction.

In the waterproof connector 900 of Patent Document 1, the distal end of the protruding portion 942 is positioned beyond the lance 9222, which is engaged with the lance engagement portion 932, in the positive Z-direction. Accordingly, each of the lances 9222 is prevented from being moved in a direction away from the contact 930, or in the positive Z-direction. This prevents disengagement of the lance 9222 from the lance engagement portion 932 and movement of the contact 930 in a negative X-direction. Thus, the waterproof connector 900 of Patent Document 1 prevents the contacts 930 from coming off from the female housing 920.

A structure such as the structure 900 of Patent Document 1 is required to have a configuration which can further reliably prevent a contact from coming off from the structure.

SUMMARY OF THE INVENTION

It is an object of the present invention to provide a structure with a configuration which can further reliably prevent a contact from coming off from the structure.

One aspect of the present invention provides a structure comprising a contact, a holding member and a retaining reinforcement member. The contact has an engaged portion. The holding member holds the contact. The holding member has a lance, a base portion and a receiving portion. The lance extends in a cantilever manner. The lance has an end in a front-rear direction. The end of the lance is provided with an engaging portion. In the front-rear direction, the engaging portion is positioned rearward of the engaged portion and faces the engaged portion. The base portion is positioned apart from the lance in a perpendicular direction perpendicular to the front-rear direction. The receiving portion is positioned between the lance and the base portion in the perpendicular direction. The retaining reinforcement member is, at least in part, formed of an elastic member. The retaining reinforcement member is inserted into the receiving portion along the front-rear direction. The elastic member is compressed and is in close contact with the base portion or with the lance, and thereby movement of the lance is regulated.

In the waterproof connector 900 of Patent Document 1, the hole portion 924 of the female housing 920 requires a clearance for insertion of the protruding portion 942 of the front sealing unit 940. Accordingly, there is an inevitable gap between the lance 9222 and the protruding portion 942 which is inserted into the hole portion 924. Thus, the waterproof connector 900 provides a space for movement of the lance 922 in the positive Z-direction also under a state where the protruding portion 942 is inserted into the hole portion 924, and does not provide a configuration which reliably prevents the contacts 930 from coming off from the female housing 920.

In contrast, the structure of the present invention is configured as follows: the retaining reinforcement member is, at least in part, formed of the elastic member; the retaining reinforcement member is inserted into the receiving portion along the front-rear direction; and the elastic member is compressed and is in close contact with the base portion or with the lance, and thereby the movement of the lance is regulated. Accordingly, the structure of the present invention provides no space for movement of the lance in a direction away from the contact. Thus, the structure of the present invention can further reliably prevent the contact from coming off from the structure. Specifically, the structure of the present invention more reliably prevents the contact from coming off from the structure in comparison with the waterproof connector 900 of Patent Document 1.

An appreciation of the objectives of the present invention and a more complete understanding of its structure may be had by studying the following description of the preferred embodiment and by referring to the accompanying drawings.

Figure 1:
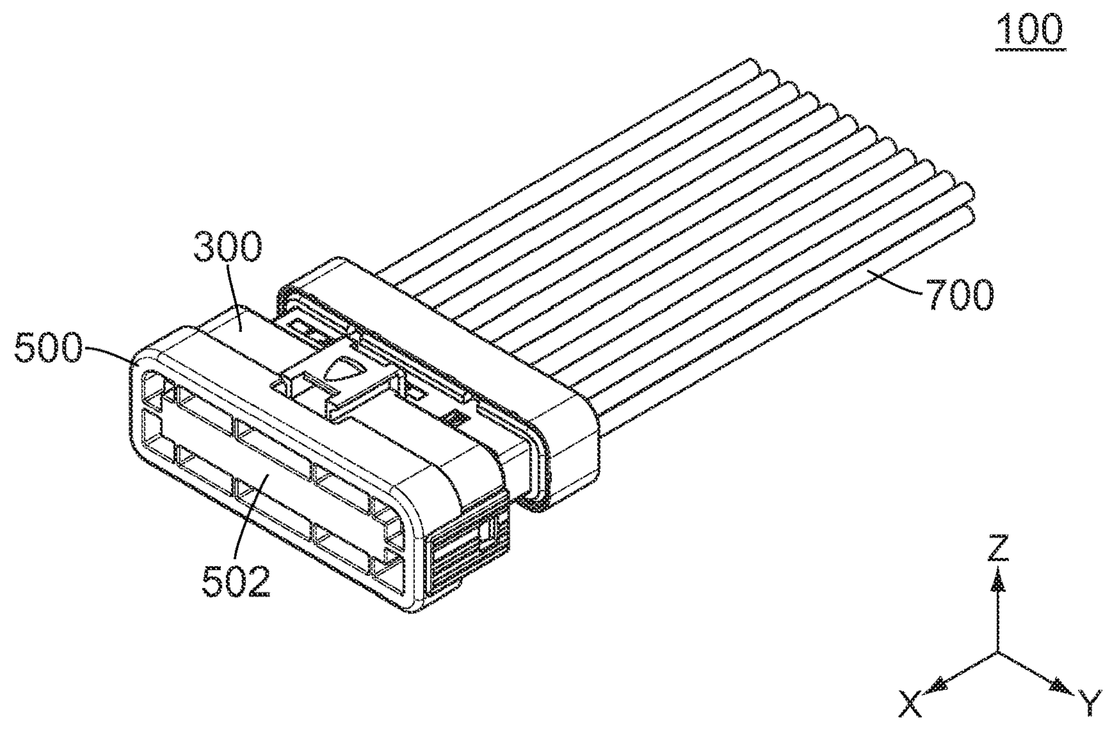
FIG. 1 is a perspective view showing a structure according to an embodiment of the present invention. In the figure, an attachment member is attached to a holding member.
Figure 2:
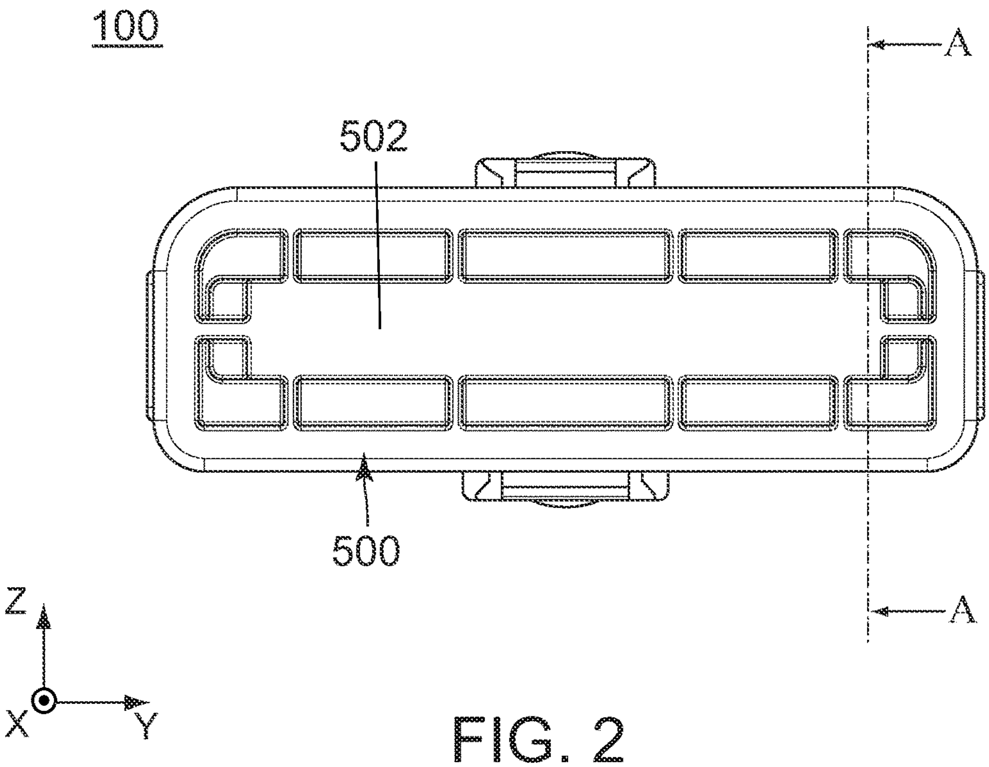
FIG. 2 is a front view showing the structure of FIG. 1.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Figure 3:
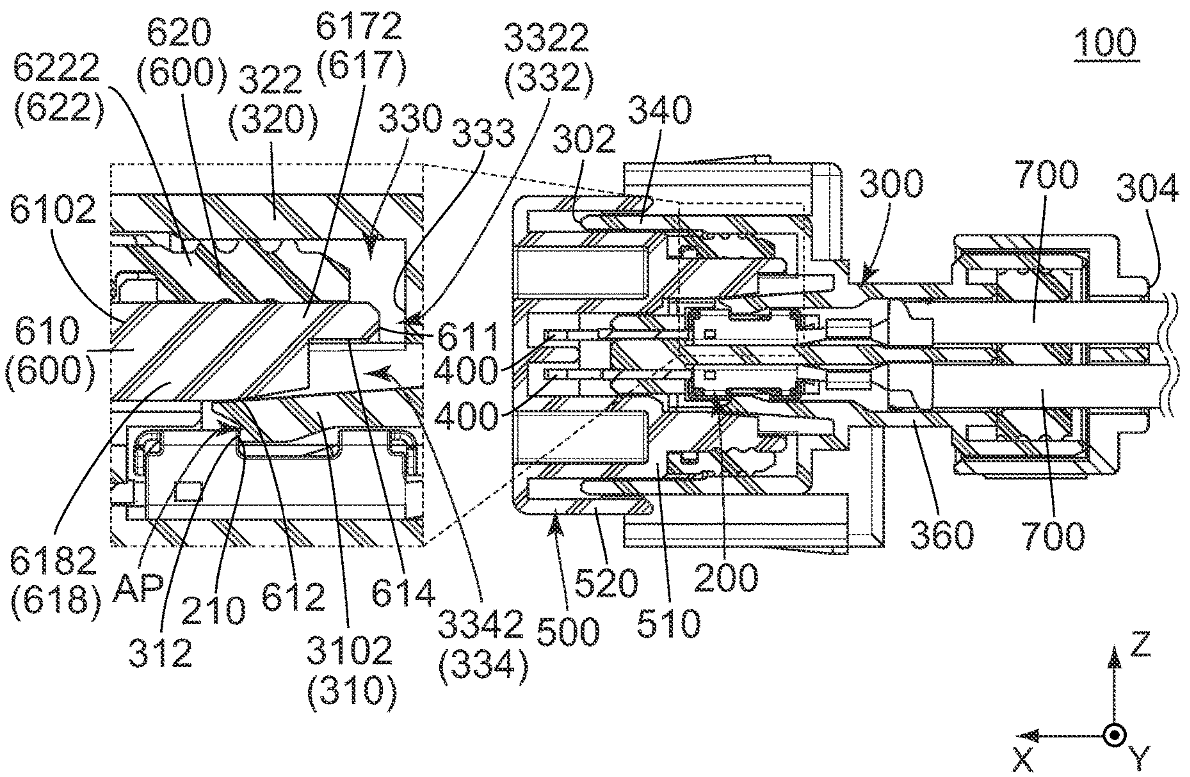
FIG. 3 is a cross-sectional view showing the structure of FIG. 2, taken along line A-A.

As shown in FIG. 3, a structure 100 according to an embodiment of the present invention comprises a plurality of contacts 200, a holding member 300 and a retaining reinforcement member 600.

Referring to FIG. 3, the holding member 300 of the present embodiment is made of insulator. The holding member 300 holds the contacts 200. The holding member 300 has a plurality of lances 310, a base portion 320 and a receiving portion 330.

Figure 10:
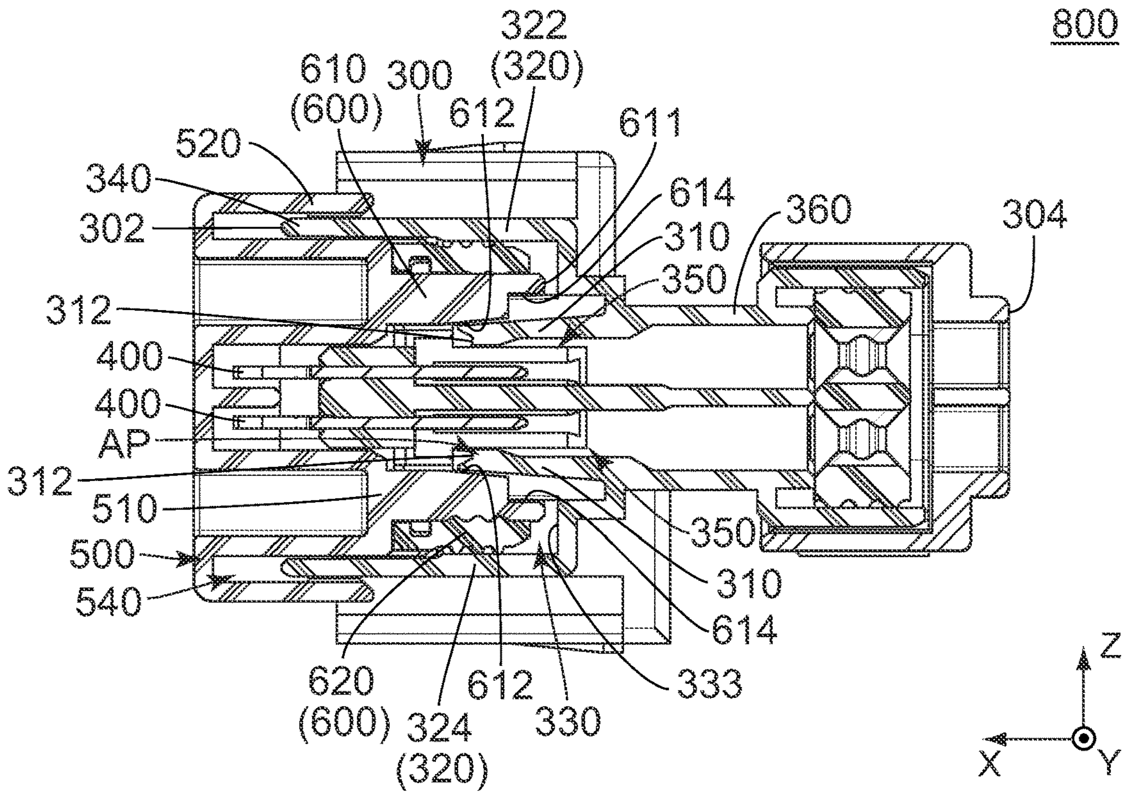
FIG. 10 is a cross-sectional view showing the structural element of FIG. 9, taken along line B-B.

As shown in FIG. 10, each of the lances 310 of the present embodiment extends in a cantilevered manner. Each of the lances 310 extends forward in a front-rear direction. Specifically, each of the lances 310 extends forward in the front-rear direction in the cantilevered manner. In the present embodiment, the front-rear direction is an X-direction. Specifically, forward is a positive X-direction while rearward is a negative X-direction. As shown in FIG. 3, the lances 310 correspond to the contacts 200, respectively.

As shown in FIG. 3, an end of the lance 310, namely, a front end of the lance 310, is provided with an engaging portion 312.

As shown in FIG. 3, the engaging portion 312 of the present embodiment is positioned at the front end of the lance 310 in the front-rear direction. The engaging portion 312 is positioned at an inner end of the lance 310 in a perpendicular direction perpendicular to the front-rear direction. In the present embodiment, the perpendicular direction is a Z-direction. In addition, the perpendicular direction is also referred to as an up-down direction. Specifically, it is assumed that upward is a positive Z-direction while downward is a negative Z-direction. The engaging portion 312 intersects with the front-rear direction. The engaging portion 312 is a surface facing forward in the front-rear direction.

Figure 11:
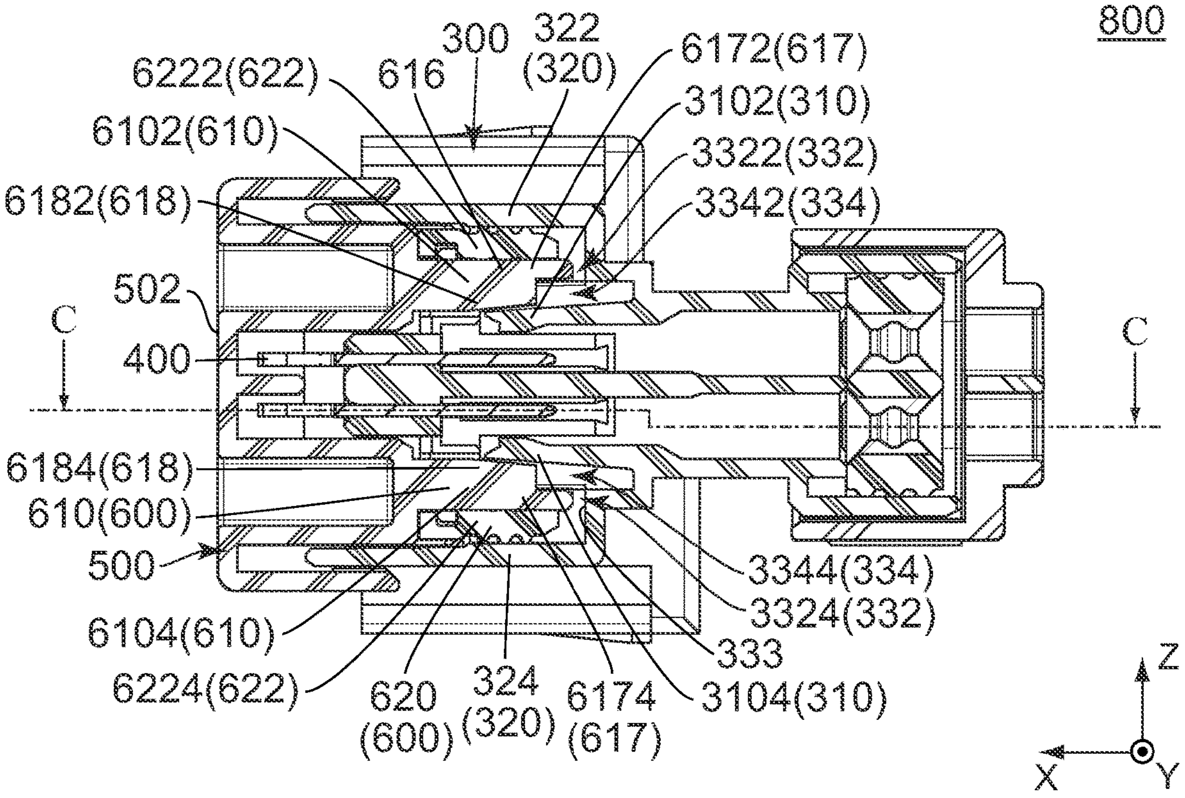
FIG. 11 is a reproduction of the cross-sectional view showing the structural element of FIG. 10.

Referring to FIG. 11, the plurality of the lances 310 include a plurality of first lances 3102 and a plurality of second lances 3104.

Referring to FIG. 11, each of the first lances 3102 of the present embodiment is positioned above any of the second lances 3104 in the up-down direction. The first lances 3102 correspond to the second lances 3104, respectively. The first lance 3102 and the corresponding second lance 3104 are arranged in the perpendicular direction perpendicular to the front-rear direction. The first lance 3102 and the corresponding second lance 3104 are arranged mirror symmetrically to each other with respect to a plane perpendicular to the perpendicular direction.

As shown in FIG. 11, each of the second lances 3104 of the present embodiment is positioned below the corresponding first lance 3102 in the up-down direction.

As shown in FIG. 10, the base portion 320 of the present embodiment is positioned apart from any of the lances 310 in the perpendicular direction perpendicular to the front-rear direction. The base portion 320 is positioned outward of any of the lances 310 in the perpendicular direction.

As shown in FIG. 11, the base portion 320 has a first base portion 322 and a second base portion 324.

As shown in FIG. 11, the first base portion 322 of the present embodiment is positioned above the second base portion 324 in the up-down direction. The first base portion 322 and the second base portion 324 are arranged in the perpendicular direction. The first base portion 322 is positioned outward of any of the first lances 3102 in the perpendicular direction. Specifically, the first base portion 322 is positioned above any of the first lances 3102 in the up-down direction.

As shown in FIG. 11, the second base portion 324 of the present embodiment is positioned below the first base portion 322 in the up-down direction. The second base portion 324 is positioned outward of any of the second lances 3104 in the perpendicular direction. Specifically, the second base portion 324 is positioned below any of the second lances 3104 in the up-down direction.

As shown in FIG. 3, the receiving portion 330 of the present embodiment is positioned between the base portion 320 and any of the lances 310 in the perpendicular direction. The receiving portion 330 is positioned outward of any of the lances 310 in the perpendicular direction. The receiving portion 330 is positioned inward of the base portion 320 in the perpendicular direction.

Referring to FIG. 11, the receiving portion 330 has two plate portion receiving portions 332 and a plurality of protruding portion receiving portions 334.

Referring to FIG. 11, each of the plate portion receiving portions 332 of the present embodiment is a space extending in the front-rear direction. The plate portion receiving portion 332 is positioned outward of the protruding portion receiving portion 334 in the perpendicular direction perpendicular to the front-rear direction. Each of the plate portion receiving portions 332 has a rear surface 333 which faces forward in the front-rear direction. The rear surface 333 defines a rear end of the plate portion receiving portion 332.

Referring to FIG. 11, the plate portion receiving portions 332 include a first plate portion receiving portion 3322 and a second plate portion receiving portion 3324.

As shown in FIG. 11, the first plate portion receiving portion 3322 of the present embodiment is positioned above the second plate portion receiving portion 3324 in the up-down direction. The first plate portion receiving portion 3322 and the second plate portion receiving portion 3324 are arranged in the perpendicular direction. The first plate portion receiving portion 3322 is positioned between the first base portion 322 and any of the first lances 3102 in the perpendicular direction. The first plate portion receiving portion 3322 is positioned outward of any of the first lances 3102 in the perpendicular direction. Specifically, the first plate portion receiving portion 3322 is positioned above any of the first lances 3102 in the up-down direction. The first plate portion receiving portion 3322 is positioned inward of the first base portion 322 in the perpendicular direction. Specifically, the first plate portion receiving portion 3322 is positioned below the first base portion 322 in the up-down direction.

As shown in FIG. 11, the second plate portion receiving portion 3324 of the present embodiment is positioned below the first plate portion receiving portion 3322 in the up-down direction. The second plate portion receiving portion 3324 is positioned between the second base portion 324 and any of the second lances 3104 in the perpendicular direction. The second plate portion receiving portion 3324 is positioned outward of any of the second lances 3104 in the perpendicular direction. Specifically, the second plate portion receiving portion 3324 is positioned below any of the second lances 3104 in the up-down direction. The second plate portion receiving portion 3324 is positioned inward of the second base portion 324 in the perpendicular direction. Specifically, the second plate portion receiving portion 3324 is positioned above the second base portion 324 in the up-down direction.

Referring to FIG. 11, each of the protruding portion receiving portions 334 of the present embodiment is a space extending in the front-rear direction. The protruding portion receiving portion 334 is positioned inward of the plate portion receiving portion 332 in the perpendicular direction perpendicular to the front-rear direction. The protruding portion receiving portion 334 is positioned between the base portion 320 and the lance 310 in the perpendicular direction. More specifically, the protruding portion receiving portions 334 correspond to the lances 310, respectively, and each of the protruding portion receiving portions 334 is positioned between the corresponding lance 310 and the base portion 320 in the perpendicular direction.

Referring to FIG. 11, the protruding portion receiving portions 334 include a plurality of first protruding portion receiving portions 3342 and a plurality of second protruding portion receiving portions 3344.

As shown in FIG. 11, each of the first protruding portion receiving portions 3342 of the present embodiment is positioned above any of the second protruding portion receiving portions 3344 in the up-down direction. The first protruding portion receiving portion 3342 and the second protruding portion receiving portion 3344 are arranged in the perpendicular direction. More specifically, the first protruding portion receiving portions 3342 correspond to the second protruding portion receiving portions 3344, respectively, and the first protruding portion receiving portion 3342 and the corresponding second protruding portion receiving portion 3344 are arranged in the perpendicular direction. The first protruding portion receiving portion 3342 is positioned between the first lance 3102 and the first base portion 322 in the perpendicular direction. More specifically, the first protruding portion receiving portions 3342 correspond to the first lances 3102, respectively, and each of the first protruding portion receiving portions 3342 is positioned between the corresponding first lance 3102 and the first base portion 322 in the perpendicular direction. Each of the first protruding portion receiving portions 3342 is positioned outward of the corresponding first lance 3102 in the perpendicular direction. Specifically, each of the first protruding portion receiving portions 3342 is positioned above the corresponding first lance 3102 in the up-down direction. Each of the first protruding portion receiving portions 3342 is positioned inward of the first base portion 322 in the perpendicular direction. Specifically, each of the first protruding portion receiving portions 3342 is positioned below the first base portion 322 in the up-down direction.

As shown in FIG. 11, each of the second protruding portion receiving portions 3344 of the present embodiment is positioned below any of the first protruding portion receiving portions 3342 in the up-down direction. The second protruding portion receiving portion 3344 is positioned between the second lance 3104 and the second base portion 324 in the perpendicular direction. More specifically, the second protruding portion receiving portions 3344 correspond to the second lances 3104, respectively, and each of the second protruding portion receiving portions 3344 is positioned between the corresponding second lance 3104 and the second base portion 324 in the perpendicular direction. Each of the second protruding portion receiving portions 3344 is positioned outward of the corresponding second lance 3104 in the perpendicular direction. Specifically, each of the second protruding portion receiving portions 3344 is positioned below the corresponding second lance 3104 in the up-down direction. Each of the second protruding portion receiving portions 3344 is positioned inward of the second base portion 324 in the perpendicular direction. Specifically, each of the second protruding portion receiving portions 3344 is positioned above the second base portion 324 in the up-down direction.

As shown in FIG. 10, the holding member 300 has a covered portion 340 with a frame-like shape.

Figure 6:
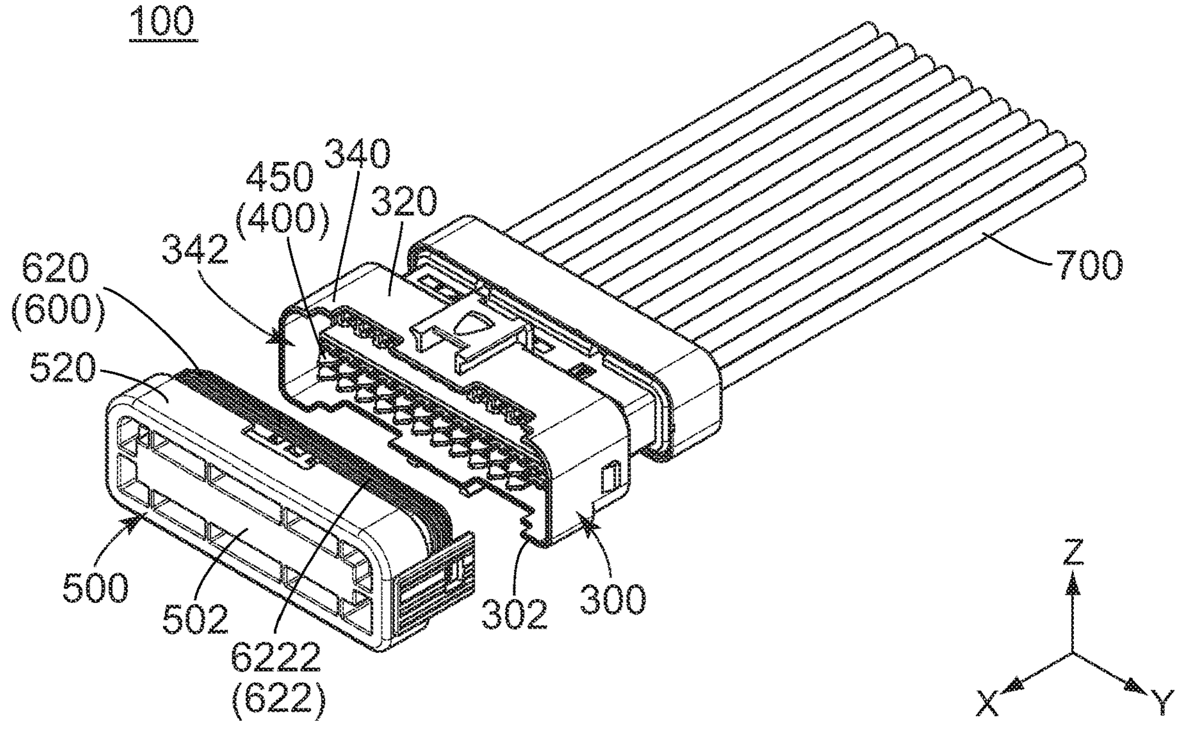
FIG. 6 is another perspective view showing the structure of FIG. 1. In the figure, the attachment member is detached from the holding member.

As shown in FIG. 10, the covered portion 340 of the present embodiment extends forward in the front-rear direction from the base portion 320. The covered portion 340 forms a front end 302 of the holding member 300 in the front-rear direction. As shown in FIG. 6, the covered portion 340 is opened forward in the front-rear direction. Specifically, the covered portion 340 has an opening 342 at the front end 302 in the front-rear direction.

As shown in FIG. 10, the holding member 300 has a plurality of contact accommodation holes 350 and a cable holding portion 360.

As shown in FIG. 10, each of the contact accommodation holes 350 of the present embodiment extends forward from a rear end 304 of the holding member 300 in the front-rear direction. The contact accommodation holes 350 correspond to the lances 310, respectively. Referring to FIGS. 3 and 10, the contact accommodation holes 350 correspond to the contacts 200, respectively. The contact accommodation hole 350 accommodates the contact 200. Specifically, each of the contact accommodation holes 350 accommodates the corresponding contact 200. As shown in FIG. 10 again, the engaging portion 312 of the lance 310 is positioned in the contact accommodation hole 350. Specifically, the engaging portion 312 of each of the lances 310 is positioned in the corresponding contact accommodation hole 350. Referring to FIGS. 10 and 11, the contact accommodation holes 350 correspond to the protruding portion receiving portions 334, respectively. The contact accommodation hole 350 is positioned inward of the protruding portion receiving portion 334 in the perpendicular direction. Specifically, each of the contact accommodation holes 350 is positioned inward of the corresponding protruding portion receiving portion 334 in the perpendicular direction. The contact accommodation hole 350 communicates with the protruding portion receiving portion 334 in the perpendicular direction. Specifically, each of the contact accommodation holes 350 communicates with the corresponding protruding portion receiving portion 334 in the perpendicular direction.

As shown in FIG. 10, the cable holding portion 360 of the present embodiment defines the rear end 304 of the holding member 300 in the front-rear direction. Each of the lances 310 extends forward in the front-rear direction from the cable holding portion 360. Specifically, a base of each of the lances 310 is coupled with the cable holding portion 360.

Figure 12:
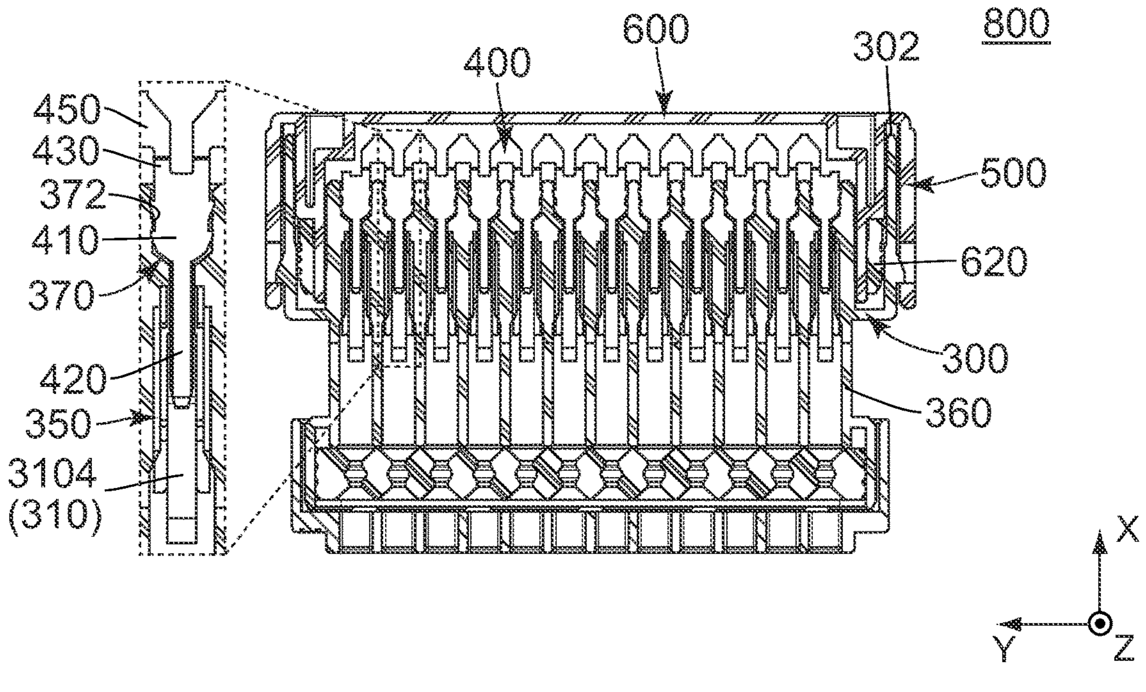
FIG. 12 is a cross-sectional view showing the structural element of FIG. 11, taken along line C-C. In the figure, a part of the structural element is enlarged and illustrated.
Figure 13:
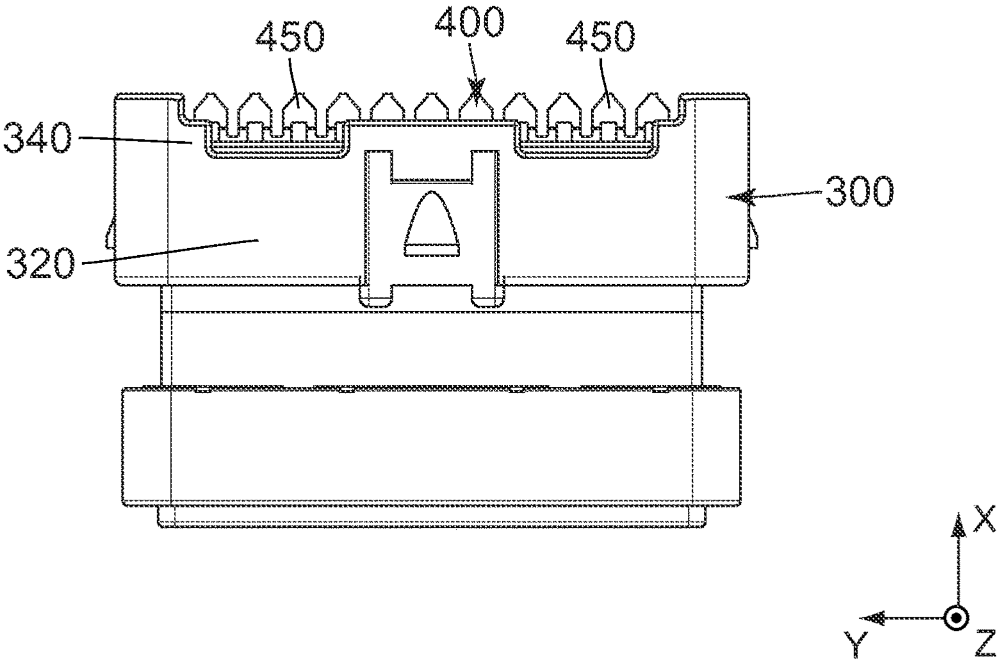
FIG. 13 is a top view showing a part of the structural element of FIG. 8 other than the attachment member.

As shown in FIG. 12, the holding member 300 has a plurality of held portion accommodation holes 370.

As shown in FIG. 12, each of the held portion accommodation holes 370 of the present embodiment is positioned rearward of the front end 302 of the holding member 300 in the front-rear direction. Each of the held portion accommodation holes 370 extends in the front-rear direction. The held portion accommodation holes 370 correspond to the contact accommodation holes 350, respectively. The held portion accommodation hole 370 communicates with the contact accommodation hole 350. Specifically, each of the held portion accommodation holes 370 communicates with the corresponding contact accommodation hole 350. Each of the held portion accommodation holes 370 has a holding portion 372. The holding portion 372 is a set of ditches which are positioned at opposite sides, respectively, of the held portion accommodation hole 370 in a pitch direction perpendicular to both the front-rear direction and the perpendicular direction. In the present embodiment, the pitch direction is a Y-direction.

Figure 7:
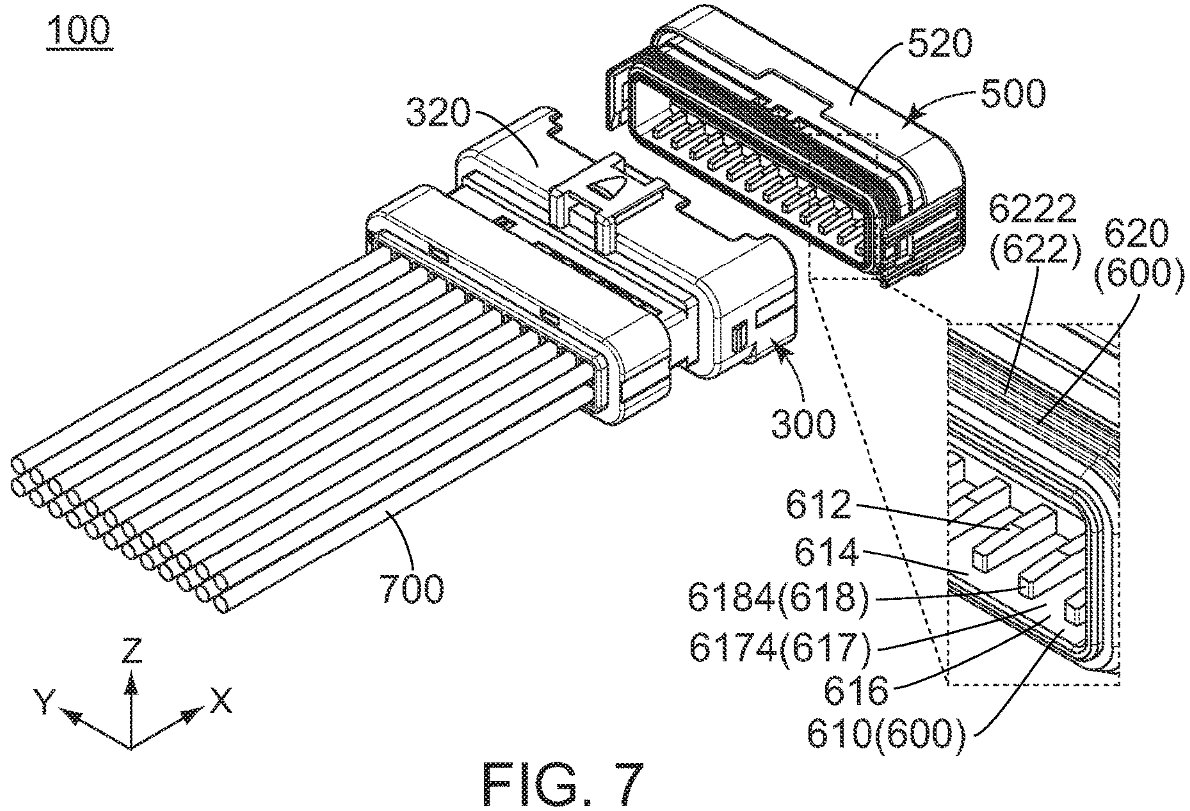
FIG. 7 is another perspective view showing the structure of FIG. 6.
Figure 8:
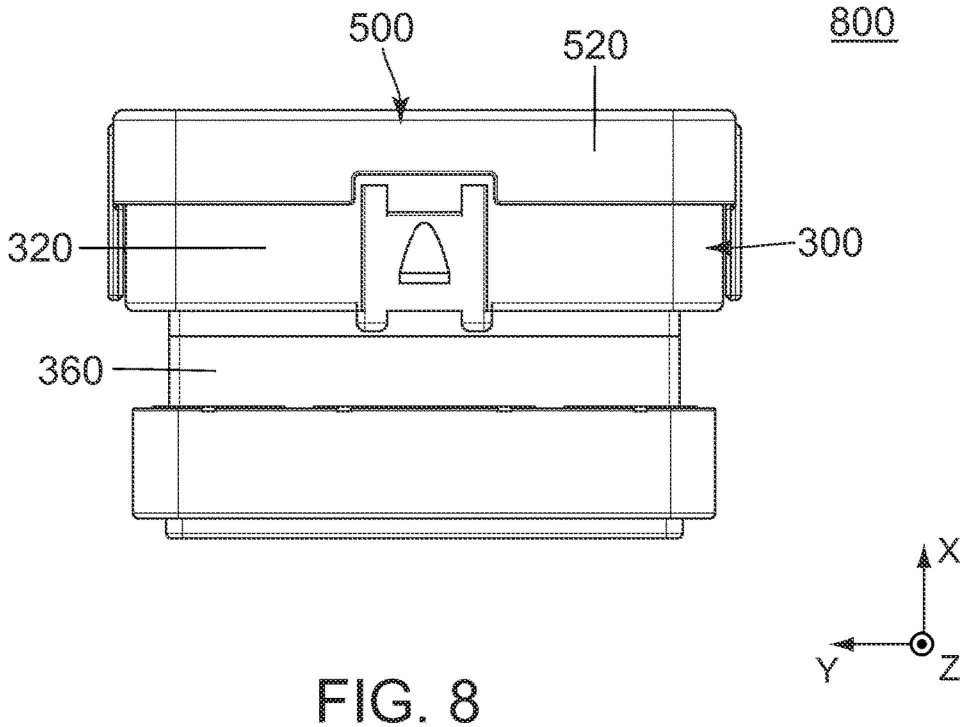
FIG. 8 is a top view showing a structural element which is included in the structure of FIG. 1.
Figure 9:
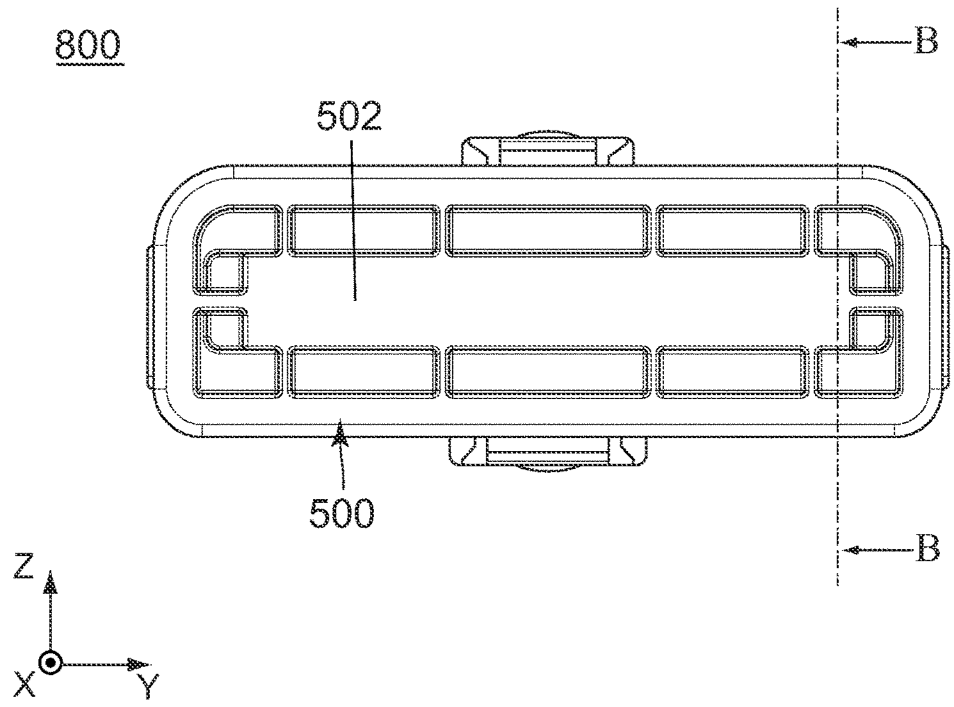
FIG. 9 is a front view showing the structural element of FIG. 8.

Referring to FIG. 7, the retaining reinforcement member 600 of the present embodiment is, at least in part, formed of an elastic member 622. More in detail, referring to FIGS. 3 and 7, the retaining reinforcement member 600 has a frame-like shape which surrounds the plurality of contacts 200. As shown in FIG. 3, the retaining reinforcement member 600 is inserted into the receiving portion 330 along the front-rear direction. The elastic member 622 is compressed and is in close contact with the base portion 320, and thereby movement of each of the lances 310 is regulated. Specifically, the elastic member 622 is compressed and is in close contact with the base portion 320, and thereby the retaining reinforcement member 600 presses each of the lances 310 so that each of the lances 310 is positioned at an appropriate position AP.

As shown in FIG. 10, the retaining reinforcement member 600 comprises a supporting portion 610 and a waterproof sealing member 620.

As shown in FIG. 7, the supporting portion 610 of the present embodiment is made of insulator with a frame-like shape. The supporting portion 610 extends in the front-rear direction. As shown in FIG. 10. the supporting portion 610 is received in the receiving portion 330.

As shown in FIG. 11, the supporting portion 610 has a plurality of first supporting portions 6102 and a plurality of second supporting portions 6104.

As shown in FIG. 11, each of the first supporting portions 6102 of the present embodiment is positioned above any of the second supporting portions 6104 in the up-down direction. The first supporting portion 6102 and the second supporting portion 6104 are arranged in the perpendicular direction perpendicular to the front-rear direction. More specifically, the first supporting portions 6102 correspond to the second supporting portions 6104, respectively, and the first supporting portion 6102 and the corresponding second supporting portion 6104 are arranged in the perpendicular direction. The first supporting portion 6102 is positioned between the first lance 3102 and the first base portion 322 in the perpendicular direction. More specifically, the first supporting portions 6102 correspond to the first lances 3102, respectively, and each of the first supporting portions 6102 is positioned between the corresponding first lance 3102 and the first base portion 322 in the perpendicular direction. Each of the first supporting portions 6102 is positioned outward of the corresponding first lance 3102 in the perpendicular direction. Specifically, each of the first supporting portions 6102 is positioned above the corresponding first lance 3102 in the up-down direction. Each of the first supporting portions 6102 is positioned inward of the first base portion 322 in the perpendicular direction. Specifically, each of the first supporting portions 6102 is positioned below the first base portion 322 in the up-down direction. The first supporting portions 6102 are received in the first protruding portion receiving portions 3342, respectively.

As shown in FIG. 11, each of the second supporting portions 6104 of the present embodiment is positioned below any of the first supporting portions 6102 in the up-down direction. The second supporting portion 6104 is positioned between the second lance 3104 and the second base portion 324 in the perpendicular direction. More specifically, the second supporting portions 6104 correspond to the second lances 3104, respectively, and each of the second supporting portions 6104 is positioned between the corresponding second lance 3104 and the second base portion 324 in the perpendicular direction. Each of the second supporting portions 6104 is positioned outward of the corresponding second lance 3104 in the perpendicular direction. Specifically, each of the second supporting portions 6104 is positioned below the corresponding second lance 3104 in the up-down direction. Each of the second supporting portions 6104 is positioned inward of the second base portion 324 in the perpendicular direction. Specifically, each of the second supporting portions 6104 is positioned above the second base portion 324 in the up-down direction. The second supporting portions 6104 are received in the second protruding portion receiving portions 3344, respectively.

As shown in FIG. 10, the supporting portion 610 has a plurality of contact portions 612 and a plurality of recessed portions 614.

As shown in FIG. 3, each of the contact portions 612 of the present embodiment intersects with the front-rear direction. More in detail, each of the contact portions 612 is oblique to the front-rear direction. Each of the contact portions 612 intersects with the perpendicular direction. More in detail, each of the contact portions 612 is oblique to the perpendicular direction. Each of the contact portions 612 faces inward in the perpendicular direction. The contact portion 612 is positioned forward of the recessed portion 614 in the front-rear direction. More in detail, the contact portions 612 correspond to the recessed portions 614, respectively, and each of the contact portions 612 is positioned forward of the corresponding recessed portion 614 in the front-rear direction. The contact portion 612 is in contact with the lance 310. More in detail, the contact portion 612 is in contact with the front end of the lance 310. The contact portion 612 of the first supporting portion 6102 is in contact with the first lance 3102 from its outside in the perpendicular direction. In other words, the contact portion 612 of the first supporting portion 6102 is in contact with the first lance 3102 from above in the up-down direction. Referring to FIGS. 10 and 11, the contact portion 612 of the second supporting portion 6104 is in contact with the second lance 3104 from its outside in the perpendicular direction. In other words, the contact portion 612 of the second supporting portion 6104 is in contact with the second lance 3104 from below in the up-down direction.

As shown in FIG. 3, each of the recessed portions 614 of the present embodiment intersects with the perpendicular direction. More in detail, each of the recessed portions 614 is perpendicular to the perpendicular direction. Each of the recessed portions 614 faces inward in the perpendicular direction. The recessed portion 614 is positioned rearward of the contact portion 612 in the front-rear direction. Specifically, each of the recessed portions 614 is positioned rearward of the corresponding contact portion 612 in the front-rear direction. The recessed portion 614 defines a rear end of the retaining reinforcement member 600 in the front-rear direction. The recessed portion 614 is spaced apart from the lance 310. More in detail, the recessed portion 614 is positioned outward of the lance 310 in the perpendicular direction and is spaced apart from the lance 310. In other words, the recessed portion 614 is in non-contact with the lance 310. The recessed portion 614 is recessed outward in the perpendicular direction, and there is a step difference formed between the recessed portion 614 and the contact portion 612. However, the present invention is not limited thereto. Specifically, the recessed portion 614 may have any shape, provided that the recessed portion 614 is spaced apart from the lance 310 so that the recessed portion 614 is in non-contact with the lance 310. For example, the recessed portion 614 may be a slope which slopes outward in the perpendicular direction from the contact portion 612 toward its rear in the front-rear direction.

As shown in FIG. 3, the recessed portion 614 of the first supporting portion 6102 is positioned outward of the first lance 3102 in the perpendicular direction and is spaced apart from the first lance 3102. Specifically, the recessed portion 614 of the first supporting portion 6102 is positioned above the first lance 3102 in the up-down direction and is spaced apart from the first lance 3102. In other words, the recessed portion 614 of the first supporting portion 6102 is in non-contact with the first lance 3102. Referring to FIGS. 10 and 11, the recessed portion 614 of the second supporting portion 6104 is positioned outward of the second lance 3104 in the perpendicular direction and is spaced apart from the second lance 3104. Specifically, the recessed portion 614 of the second supporting portion 6104 is positioned below the second lance 3104 in the up-down direction and is spaced apart from the second lance 3104. In other words, the recessed portion 614 of the second supporting portion 6104 is in non-contact with the second lance 3104.

As described above, the structure 100 of the present embodiment is configured so that the contact portion 612 of the supporting portion 610 is in contact with the lance 310 while the recessed portion 614 of the supporting portion 610 is spaced apart from the lance 310. Accordingly, the supporting portion 610 is in contact with only the front end of the lance 310 and applies no stress to the base of the lance 310, and thereby the lance 310, which extends in the cantilevered manner, is prevented from being broken.

As shown in FIG. 3, the supporting portion 610 is formed with a chamfered surface 611. The chamfered surface 611 is positioned at a rear end of the supporting portion 610 in the front-rear direction. The chamfered surface 611 is positioned at a rear end of the recessed portion 614 in the front-rear direction. The chamfered surface 611 functions as a guide which guides the waterproof sealing member 620 when the waterproof sealing member 620 is attached to the supporting portion 610.

As shown in FIG. 7, the supporting portion 610 has a frame portion 616 and a plurality of protruding portions 618.

As shown in FIG. 7, the frame portion 616 of the present embodiment defines the rear end of the supporting portion 610 in the front-rear direction. The frame portion 616 has a cross-section, which has a rectangular ring shape with rounded corners, in a plane perpendicular to the front-rear direction. Each of the recessed portions 614 is provided on the frame portion 616. Each of the recessed portions 614 is positioned at a rear end of the frame portion 616 in the front-rear direction.

As shown in FIG. 11, the frame portion 616 has two plate portions 617.

Referring to FIG. 7, each of the plate portions 617 of the present embodiment has a flat-plate shape perpendicular to the perpendicular direction. Referring to FIG. 11, the two plate portions 617 are arranged in the perpendicular direction. The plate portions 617 are received in the plate portion receiving portions 332, respectively.

As shown in FIG. 11, the plate portions 617 include a first plate portion 6172 and a second plate portion 6174.

Referring to FIG. 11, the first plate portion 6172 of the present embodiment has the flat-plate shape perpendicular to the perpendicular direction. The first plate portion 6172 and the second plate portion 6174 are arranged in the perpendicular direction. The first plate portion 6172 is positioned above the second plate portion 6174 in the up-down direction. The first plate portion 6172 is received in the first plate portion receiving portion 3322.

Referring to FIG. 11, the second plate portion 6174 of the present embodiment has the flat-plate shape perpendicular to the perpendicular direction. The second plate portion 6174 is positioned below the first plate portion 6172 in the up-down direction. The second plate portion 6174 is received in the second plate portion receiving portion 3324.

Referring to FIG. 7, each of the protruding portions 618 of the present embodiment protrudes inward in the perpendicular direction from the frame portion 616. As shown in FIG. 11, the protruding portion 618 is positioned outward of the lance 310 in the perpendicular direction. More in detail, the protruding portions 618 correspond to the lances 310, respectively, and each of the protruding portions 618 is positioned outward of the corresponding lance 310 in the perpendicular direction. The protruding portions 618 are received in the protruding portion receiving portions 334, respectively. Referring to FIGS. 10 and 11, the protruding portions 618 correspond to the contact portions 612 and the recessed portions 614, respectively. Each of the contact portions 612 is provided on the corresponding protruding portion 618. Each of the recessed portions 614 is positioned rearward of the corresponding protruding portion 618 in the front-rear direction.

As shown in FIG. 11, the protruding portions 618 include a plurality of first protruding portions 6182 and a plurality of second protruding portions 6184.

As shown in FIG. 11, each of the first protruding portions 6182 of the present embodiment is positioned above any of the second protruding portions 6184 in the up-down direction. Each of the first protruding portions 6182 protrudes inward in the perpendicular direction from the first plate portion 6172. Specifically, each of the first protruding portions 6182 protrudes downward in the up-down direction from the first plate portion 6172. Each of the first protruding portions 6182 is positioned outward of any of the first lances 3102 in the perpendicular direction. More in detail, the first protruding portions 6182 correspond to the first lances 3102, respectively, and each of the first protruding portions 6182 is positioned outward of the corresponding first lance 3102 in the perpendicular direction. Each of the first protruding portions 6182 is positioned above any of the first lances 3102 in the up-down direction. Specifically, each of the first protruding portions 6182 is positioned above the corresponding first lance 3102 in the up-down direction. The first protruding portions 6182 are received in the first protruding portion receiving portions 3342, respectively.

As shown in FIG. 11, each of the second protruding portions 6184 of the present embodiment is positioned below any of the first protruding portions 6182 in the up-down direction. Each of the second protruding portions 6184 protrudes inward in the perpendicular direction from the second plate portion 6174. Specifically, each of the second protruding portions 6184 protrudes upward in the up-down direction from the second plate portion 6174. Each of the second protruding portions 6184 is positioned outward of any of the second lances 3104 in the perpendicular direction. More in detail, the second protruding portions 6184 correspond to the second lances 3104, respectively, and each of the second protruding portions 6184 is positioned outward of the corresponding second lance 3104 in the perpendicular direction. Each of the second protruding portions 6184 is positioned below any of the second lances 3104 in the up-down direction. Specifically, each of the second protruding portions 6184 is positioned below the corresponding second lance 3104 in the up-down direction. The second protruding portions 6184 are received in the second protruding portion receiving portions 3344, respectively.

Referring to FIG. 7, the waterproof sealing member 620 of the present embodiment is made of insulator. Referring to FIGS. 6 and 7, the waterproof sealing member 620 is formed of the elastic member 622 with a ring shape. Specifically, the retaining reinforcement member 600 comprises the supporting portion 610 and the elastic member 622. Referring to FIGS. 7 and 10, in the plane perpendicular to the front-rear direction, the waterproof sealing member 620 is attached on the supporting portion 610 and is supported by the supporting portion 610. In other words, the elastic member 622 is supported by the supporting portion 610. In the plane perpendicular to the front-rear direction, the waterproof sealing member 620 is attached on an outer surface of the supporting portion 610 having the frame-like shape. As shown in FIG. 3, the elastic member 622 is positioned between the supporting portion 610 and the base portion 320. The waterproof sealing member 620, which is formed of the elastic member 622 with the ring shape, is compressed and is in close contact with the base portion 320, and thereby the movement of each of the lances 310 is regulated. In the front-rear direction, a front end of the covered portion 340 is positioned forward of a front end of the waterproof sealing member 620. In the front-rear direction, a front end of the recessed portion 614 is positioned rearward of the front end of the waterproof sealing member 620. In the front-rear direction, the rear end of the recessed portion 614 is positioned rearward of a rear end of the waterproof sealing member 620.

As shown in FIG. 11, the elastic member 622 has a first elastic portion 6222 and a second elastic portion 6224.

As shown in FIG. 11, the first elastic portion 6222 of the present embodiment is positioned above the second elastic portion 6224 in the up-down direction. The first elastic portion 6222 and the second elastic portion 6224 are arranged in the perpendicular direction. The first elastic portion 6222 is positioned between the first base portion 322 and any of the first supporting portions 6102 in the perpendicular direction. The first elastic portion 6222 is positioned outward of any of the first supporting portions 6102 in the perpendicular direction. Specifically, the first elastic portion 6222 is positioned above any of the first supporting portions 6102 in the up-down direction. The first elastic portion 6222 is positioned inward of the first base portion 322 in the perpendicular direction. Specifically, the first elastic portion 6222 is positioned below the first base portion 322 in the up-down direction.

Referring to FIG. 11, the second elastic portion 6224 of the present embodiment is positioned below the first elastic portion 6222 in the up-down direction. The second elastic portion 6224 is positioned between the second base portion 324 and any of the second supporting portions 6104 in the perpendicular direction. The second elastic portion 6224 is positioned outward of any of the second supporting portions 6104 in the perpendicular direction. Specifically, the second elastic portion 6224 is positioned below any of the second supporting portions 6104 in the up-down direction. The second elastic portion 6224 is positioned inward of the second base portion 324 in the perpendicular direction. Specifically, the second elastic portion 6224 is positioned above the second base portion 324 in the up-down direction.

Figure 5:
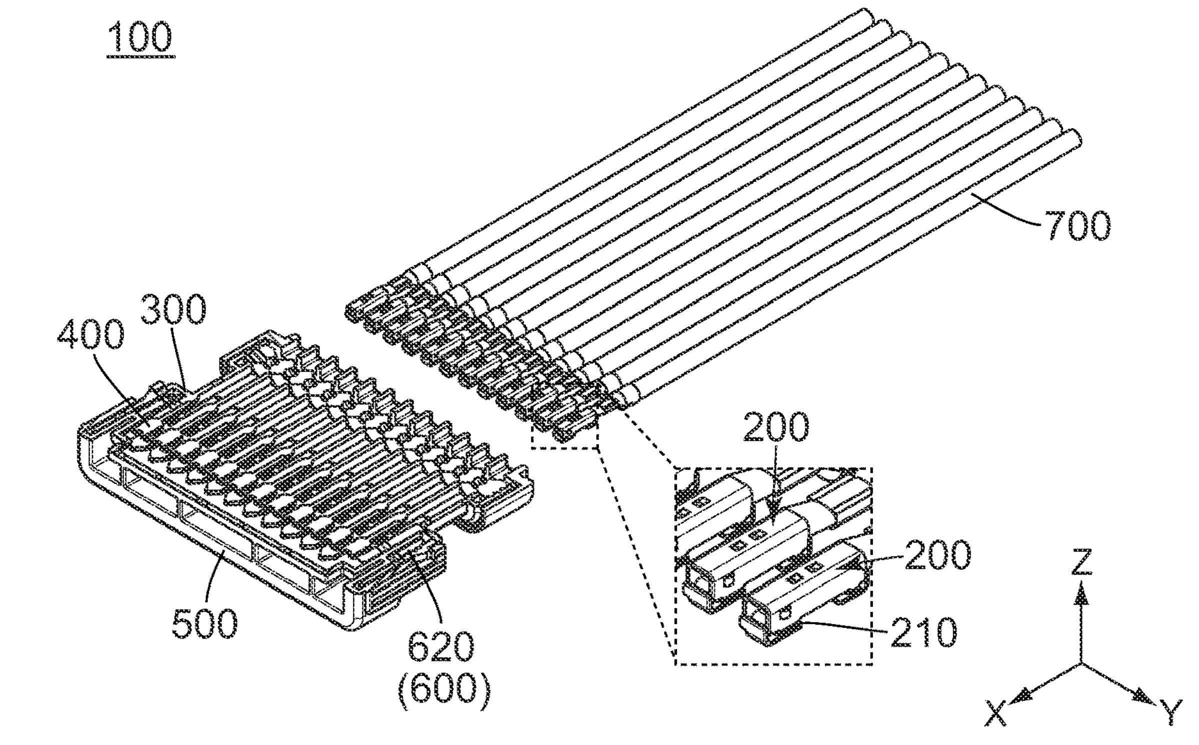
FIG. 5 is another partially cutaway cross-sectional, perspective view showing the structure of FIG. 1. In the figure, each of contacts is not held by the holding member.

Referring to FIG. 5, each of the contacts 200 of the present embodiment is made of metal. Each of the contacts 200 is a so-called socket contact, or a female contact. Referring to FIGS. 3 and 5, the contacts 200 are arranged in two rows in the perpendicular direction. The contacts 200 of each row are arranged in the pitch direction. As shown in FIG. 3, a cable 700 is connected to a rear end of the contact 200 in the front-rear direction. Each of the contacts 200 has an engaged portion 210.

As shown in FIG. 3, the engaged portion 210 of the present embodiment faces rearward in the front-rear direction. The engaged portion 210 intersects with the front-rear direction. In the front-rear direction, the engaging portion 312 is positioned rearward of the engaged portion 210 in the front-rear direction and faces the engaged portion 210. More in detail, when the engaging portion 312 is positioned at the appropriate position AP, the engaging portion 312 is positioned rearward of the engaged portion 210 in the front-rear direction and faces the engaged portion 210 in the front-rear direction.

As shown in FIG. 3, the structure 100 of the present embodiment comprises a plurality of short-circuit terminals 400 and an attachment member 500. Referring to FIG. 10, the holding member 300, the attachment member 500 and the short-circuit terminals 400 form a structural element 800.

Figure 4:
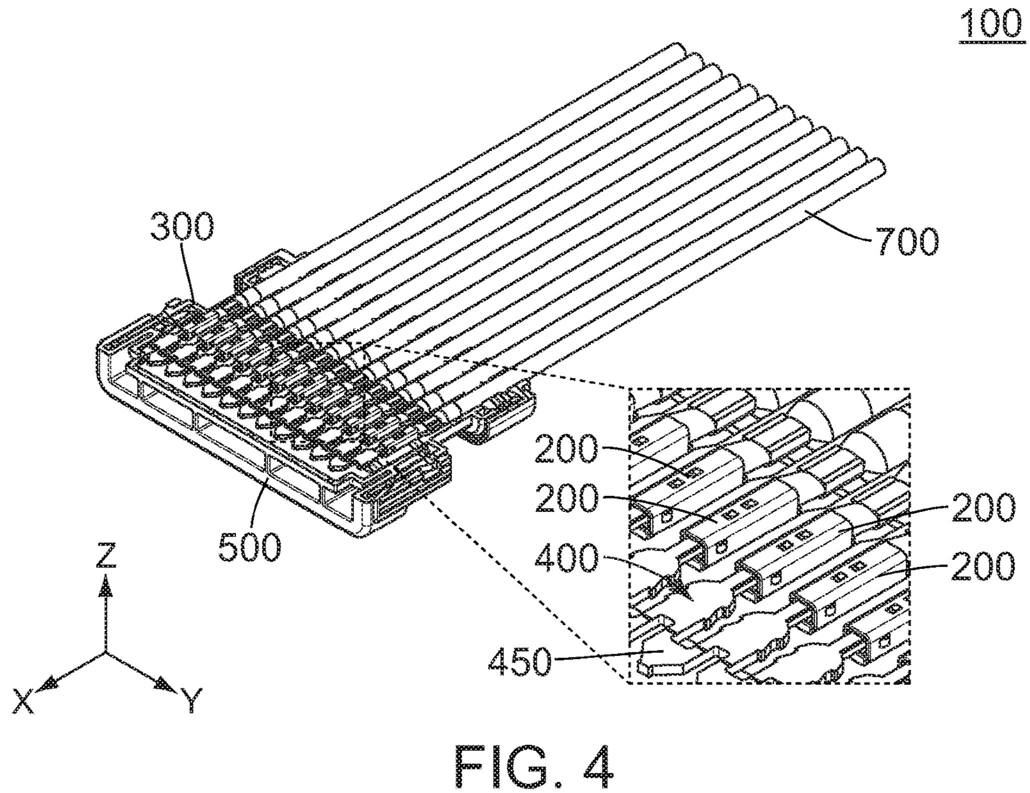
FIG. 4 is a partially cutaway cross-sectional, perspective view showing the structure of FIG. 1.
Figure 15:
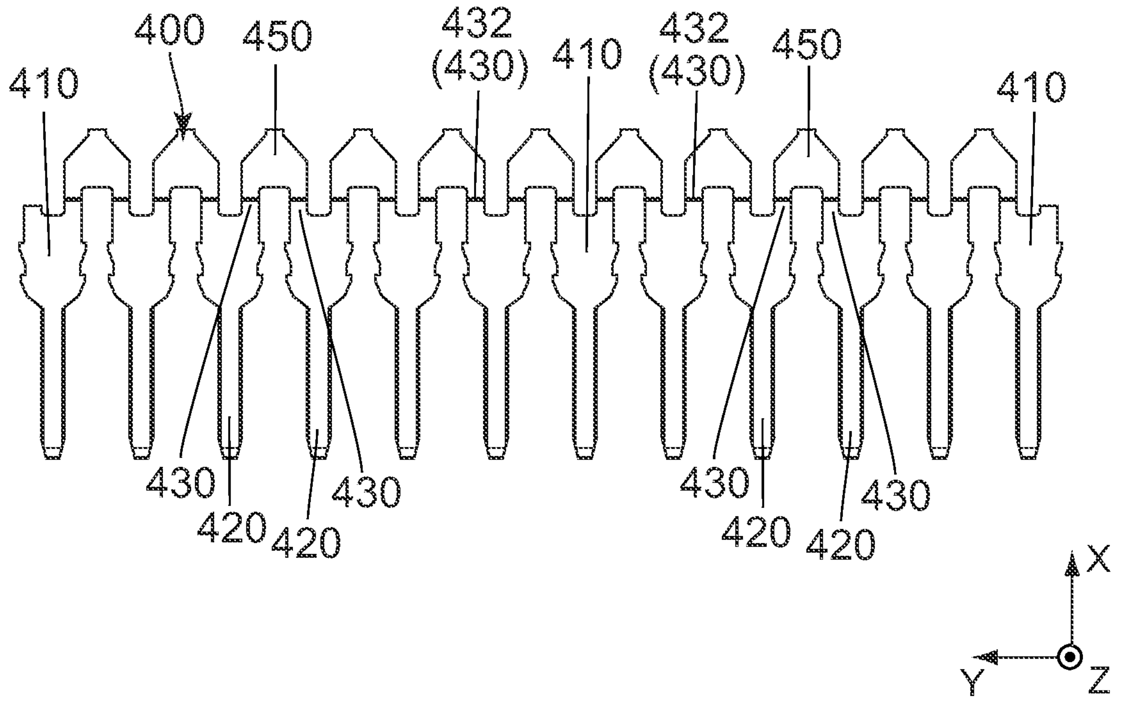
FIG. 15 is a top view showing the short-circuit terminals of FIG. 14.

Referring to FIG. 15, each of the short-circuit terminals 400 of the present embodiment is made of metal. As shown in FIG. 12, each of the short-circuit terminals 400 is press-fit into and held by the holding member 300. It is noted that none of the short-circuit terminals 400 are held by the attachment member 500. As shown in FIG. 10, each of the short-circuit terminals 400 is covered with the attachment member 500. As shown in FIG. 4, the short-circuit terminal 400 short-circuits a plurality of the contacts 200 with each other. Accordingly, the structure 100 of the present embodiment functions as a waterproof branch connector 100. However, the present invention is not limited thereto, but the structure 100 may have no short-circuit terminal 400. Specifically, the structure 100 may be a standard connector which is mateable with a mating connector.

Referring to FIG. 15, each of the short-circuit terminals 400 of the present embodiment has a plurality of held portions 410, a plurality of contacting portions 420, a plurality of extending portions 430 and a plurality of coupling portions 450.

As shown in FIG. 12, the held portion 410 of the present embodiment is held by the holding portion 372. Referring to FIGS. 11 and 12, the held portions 410 are grouped into two rows in the perpendicular direction. As shown in FIG. 12 again, the held portions 410 of each row are arranged in the pitch direction. The held portions 410 correspond to the held portion accommodation holes 370, respectively, of the holding member 300. Each of the held portions 410 is press-fit into the holding portion 372 of the corresponding held portion accommodation hole 370.

As shown in FIG. 15, each of the contacting portions 420 of the present embodiment is a so-called pin contact, or a male contact. The contacting portions 420 are arranged at a constant interval in the pitch direction. The contacting portions 420 correspond to the held portions 410, respectively. Each of the contacting portions 420 is positioned rearward of the corresponding held portion 410 in the front-rear direction.

As shown in FIG. 12, each of the extending portions 430 of the present embodiment extends forward in the front-rear direction from one of the held portions 410 and protrudes forward in the front-rear direction beyond the holding portion 372. As shown in FIG. 15, the extending portions 430 are positioned apart from each other in the pitch direction.

As shown in FIG. 15, the extending portion 430 of the present embodiment is provided with a frangible portion 432 which has less strength. More specifically, the frangible portion 432 has the lowest strength in the extending portion 430. The frangible portion 432 has the strength lower than any of the held portion 410 and the coupling portion 450. The frangible portion 432 is a ditch extending in the pitch direction.

Figure 14:
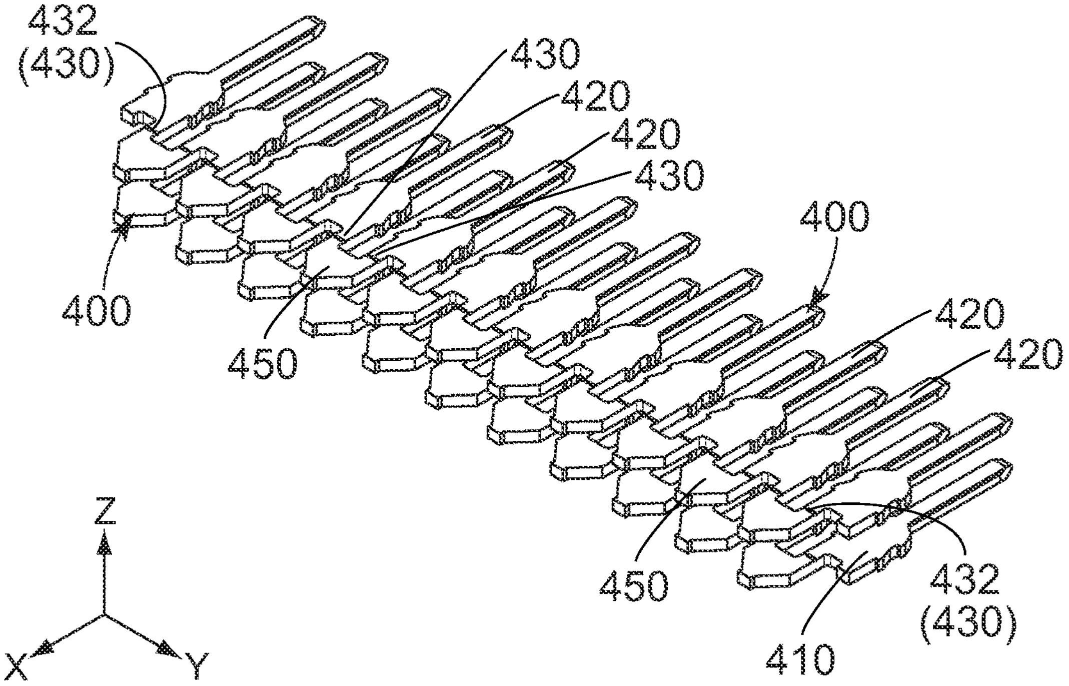
FIG. 14 is a perspective view showing short-circuit terminals which are included in the structure of FIG. 6. In the figure, coupling portions of the short-circuit terminals are not snapped off.
Figure 16:
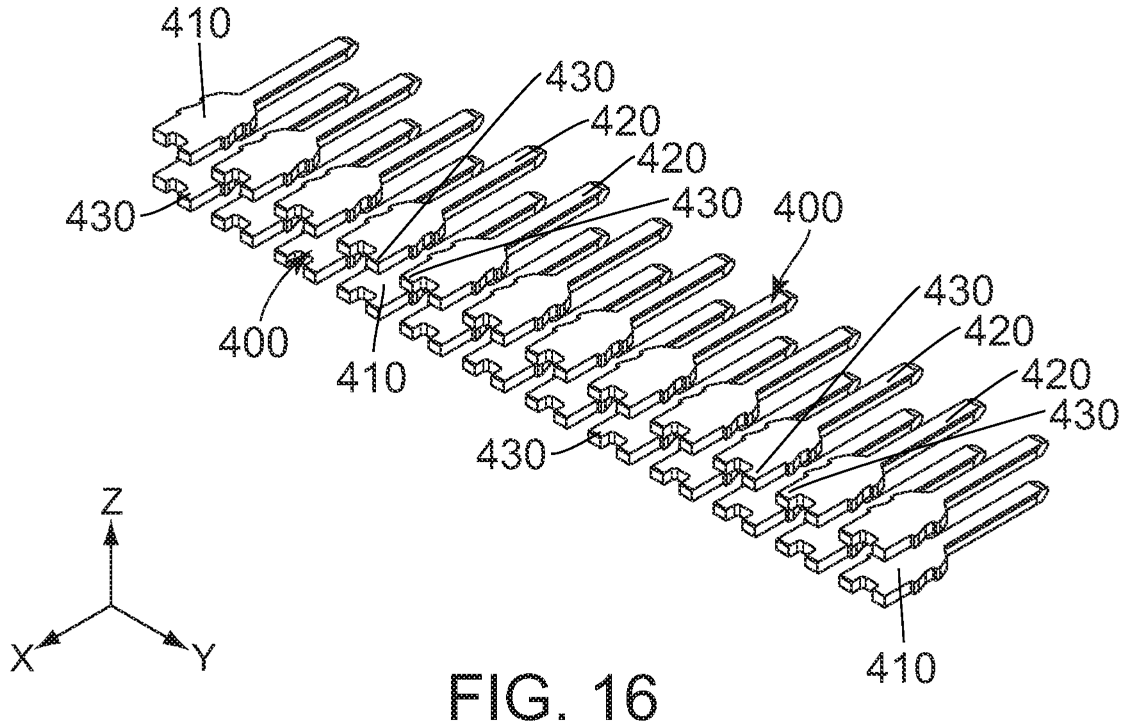
FIG. 16 is another perspective view showing the short-circuit terminals of FIG. 14. In the figure, the coupling portions of the short-circuit terminals are snapped off.
Figure 17:
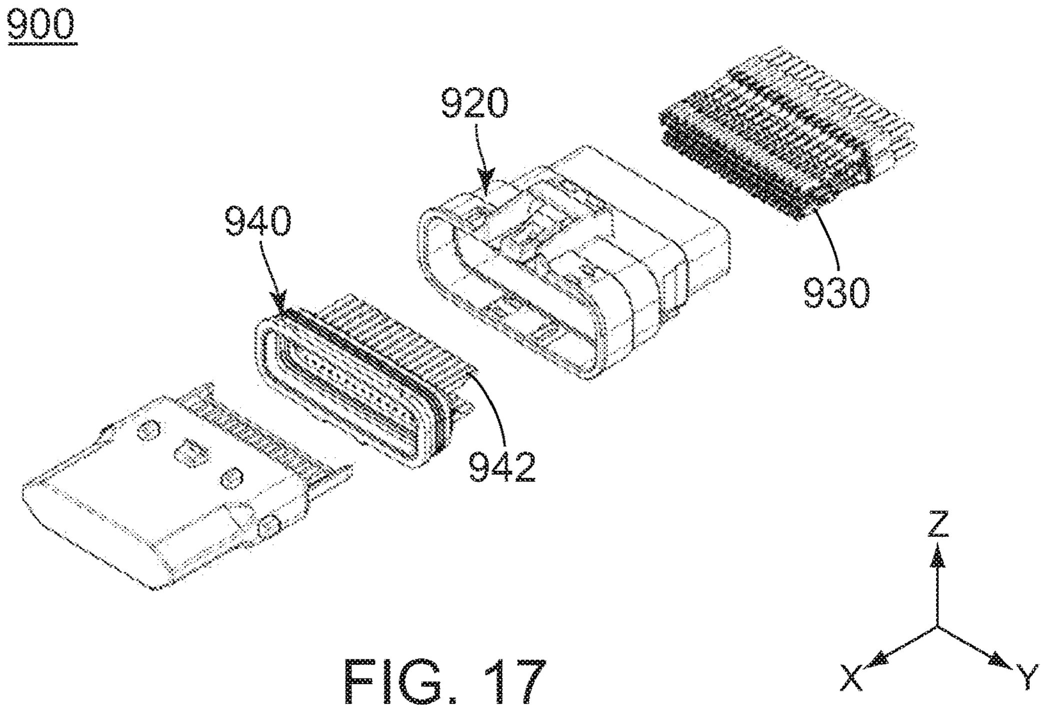
FIG. 17 PRIOR ART
FIG. 17 is an exploded, perspective view showing a structure of Patent Document 1.
Figure 18:
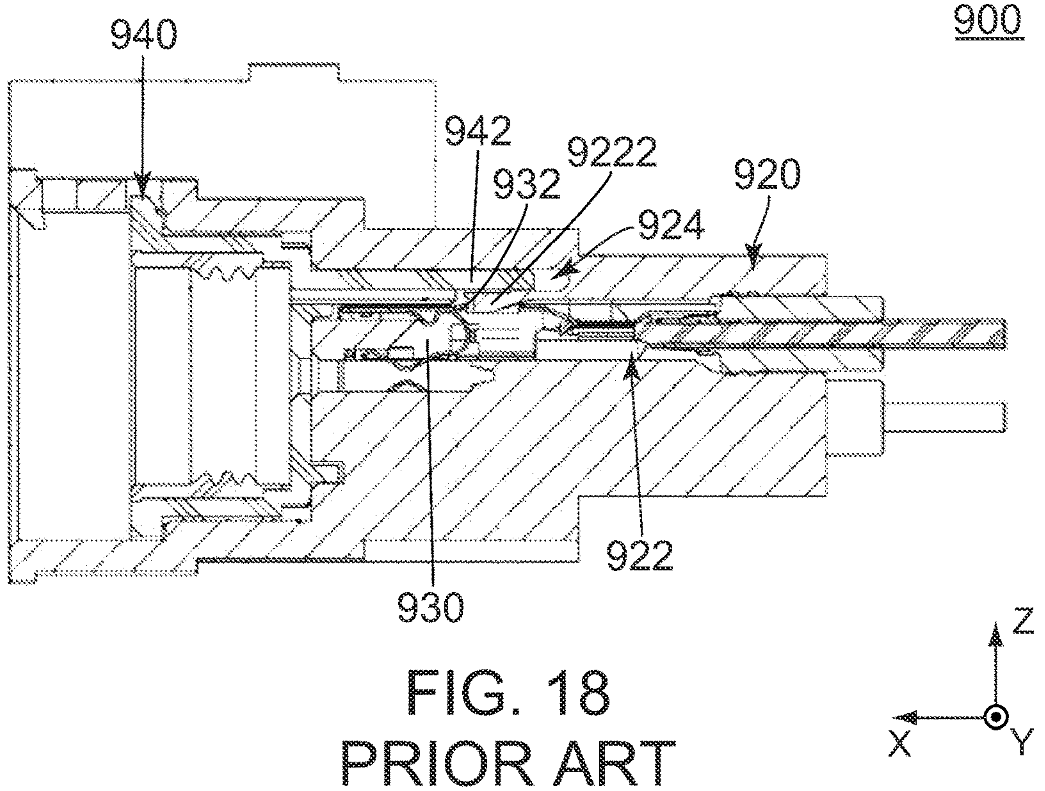
FIG. 18 PRIOR ART
FIG. 18 is a cross-sectional view showing the structure of FIG. 17.

As shown in FIG. 15, the coupling portions 450 of the present embodiment are positioned apart from each other in the pitch direction. The coupling portions 450 are positioned rearward of the extending portions 430 in the front-rear direction. Each of the coupling portions 450 couples two of the extending portions 430 with each other. Two of the held portions 410, which are adjacent to each other in the pitch direction, are coupled with the two extending portions 430, respectively. Each of the coupling portions 450 couples the extending portion 430, which extends from one of the two adjacent held portions 410 in the pitch direction, with the extending portion 430 which extends from a remaining one of the two adjacent held portions 410 in the pitch direction. Referring to FIGS. 14 and 16, the coupling portion 450 can be snapped off from the short-circuit terminal 400. More specifically, the coupling portion 450 is separable from the short-circuit terminal 400 by splitting each of the two extending portions 430 at the frangible portion 432 into two parts which are separated from each other in the front-rear direction.

As shown in FIG. 3, the attachment member 500 of the present embodiment is attached to the holding member 300 and covers the short-circuit terminals 400. As shown in FIG. 6, the attachment member 500 is distinct and separated from the holding member 300. Referring to FIGS. 6 and 12, each of the held portion accommodation holes 370 communicates with the outside of the holding member 300 through the opening 342 of the covered portion 340 under a state where the attachment member 500 is not attached to the holding member 300. As shown in FIG. 10, the attachment member 500 comprises the supporting portion 610 and the waterproof sealing member 620. In other words, a part of the attachment member 500 forms the retaining reinforcement member 600.

As shown in FIG. 10, the attachment member 500 comprises a main portion 510 in addition to the supporting portion 610 and the waterproof sealing member 620. The main portion 510 is positioned forward of the supporting portion 610 in the front-rear direction. The main portion 510 is positioned forward of the waterproof sealing member 620 in the front-rear direction. The supporting portion 610 extends rearward in the front-rear direction from the main portion 510.

As shown in FIG. 10, the attachment member 500 has a cap portion 520.

As shown in FIG. 10, the cap portion 520 of the present embodiment defines a front end of the attachment member 500 in the front-rear direction. The cap portion 520 defines opposite outer ends of the attachment member 500 in the perpendicular direction. The cap portion 520 is positioned forward of the supporting portion 610 in the front-rear direction. In the front-rear direction, a rear end of the cap portion 520 is positioned forward of a front end of the supporting portion 610. A part of the cap portion 520 is positioned outward of the supporting portion 610 in the perpendicular direction. The cap portion 520 is positioned forward of the waterproof sealing member 620 in the front-rear direction. In the front-rear direction, the rear end of the cap portion 520 is positioned forward of the front end of the waterproof sealing member 620. A part of the cap portion 520 is positioned outward of the waterproof sealing member 620 in the perpendicular direction. Referring to FIGS. 6 and 10, the structure 100 is configured as follows: the cap portion 520 covers the covered portion 340 from the outside of the covered portion 340 in the direction perpendicular to the front-rear direction and blocks the opening 342; and the waterproof sealing member 620, which is formed of the elastic member 622 with the ring shape, is compressed and is in close contact with the base portion 320. This configuration enables the structure 100, or the waterproof branch connector 100, to have a waterproof characteristic. Accordingly, the waterproof sealing member 620 is prevented from coming into direct contact with rainwater even if the waterproof branch connector 100 is used outdoors under a state where the waterproof branch connector 100 is tiled so that a front surface 502 of the attachment member 500 faces upward. This prevents degradation of the waterproof characteristic of the waterproof branch connector 100.

As shown in FIG. 10, the attachment member 500 has a covered portion accommodation portion 540.

As shown in FIG. 10, the covered portion accommodation portion 540 of the present embodiment is recessed forward in the front-rear direction. The covered portion accommodation portion 540 is positioned inward of a part of the cap portion 520 in a direction perpendicular to the front-rear direction. The covered portion accommodation portion 540 is positioned outward of the supporting portion 610 in the direction perpendicular to the front-rear direction. The covered portion accommodation portion 540 is positioned outward of the waterproof sealing member 620 in the direction perpendicular to the front-rear direction. The covered portion accommodation portion 540 accommodates the covered portion 340.

Although the specific explanation about the present invention is made above referring to the embodiments, the present invention is not limited thereto and is susceptible to various modifications and alternative forms.

Although the attachment member 500 of the present embodiment has the cap portion 520, the present invention is not limited thereto. Specifically, the attachment member 500 may have no cap portion 520. In other words, the attachment member 500 may consist of only the supporting portion 610, which has the frame-like shape, and the elastic member 622 with the ring shape.

Although the retaining reinforcement member 600 comprises the supporting portion 610 and the waterproof sealing member 620 formed of the elastic member 622, the present invention is not limited thereto. Specifically, the retaining reinforcement member 600 may have no supporting portion 610. In other words, the retaining reinforcement member 600 may consist of only the elastic member 622. Alternatively, the retaining reinforcement member 600 may consist of a plurality of elastic members 622 which are received in the receiving portion 330. Further alternatively, the retaining reinforcement member 600 may consist of a plurality of inserting members which are received in the receiving portion 330 and each of which is partially formed of an elastic member 622.

As described above, the structure 100 of the present embodiment is configured as follows: the elastic member 622 is compressed and is in close contact with the base portion 320, and thereby the movement of each of the lances 310 is regulated. However, the present invention is not limited thereto, but the structure 100 may be configured as follows: the elastic member 622 is compressed and is in close contact with the lances 310, and thereby the movement of each of the lances 310 is regulated. In other words, the structure 100 should be configured as follows: the elastic member 622 is compressed and is in close contact with the base portion 320 or with and the lance 310, and thereby the movement of the lance 310 is regulated.

Although the structure 100 of the present embodiment has the plurality of contacts 200, the plurality of lances 310, the plurality of protruding portion receiving portions 334, the plurality of contact accommodation holes 350, the plurality of contact portions 612, the plurality of recessed portions 614 and the plurality of protruding portions 618, the present invention is not limited thereto. Specifically, each of the contact 200, the lance 310, the protruding portion receiving portion 334, the contact accommodation hole 350, the contact portion 612, the recessed portion 614 and the protruding portion 618 may be one in number.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

What is claimed is:

1. A structure comprising a contact, a holding member and a retaining reinforcement member, wherein:
the contact has an engaged portion;
the holding member holds the contact;
the holding member has a lance, a base portion and a receiving portion;
the lance extends in a cantilever manner;
the lance has an end in a front-rear direction;
the end of the lance is provided with an engaging portion;
in the front-rear direction, the engaging portion is positioned rearward of the engaged portion and faces the engaged portion;
the base portion is positioned apart from the lance in a perpendicular direction perpendicular to the front-rear direction;
the receiving portion is positioned between the lance and the base portion in the perpendicular direction;
the retaining reinforcement member is, at least in part, formed of an elastic member;
the retaining reinforcement member is inserted into the receiving portion along the front-rear direction;
the elastic member is compressed and is in close contact with the base portion or with the lance, and thereby movement of the lance is regulated;
the structure comprises a plurality of the contacts;
the retaining reinforcement member has a frame-like shape which surrounds the plurality of contacts;
the retaining reinforcement member comprises a supporting portion and a waterproof sealing member;
the supporting portion is made of an insulator with a frame-like shape;
the supporting portion extends in the front-rear direction;
the waterproof sealing member is formed of the elastic member with a ring shape;
in a plane perpendicular to the front-rear direction, the waterproof sealing member is attached on the supporting portion and is supported by the supporting portion; and
the waterproof sealing member is compressed and is in close contact with the base portion, and thereby the movement of the lance is regulated while the structure has a waterproof characteristic.

2. The structure as recited in claim 1, wherein:
the structure comprises a short-circuit terminal and an attachment member;
the short-circuit terminal short-circuits a plurality of the contacts with each other;
a part of the attachment member forms the retaining reinforcement member;
the attachment member is distinct and separated from the holding member;
the attachment member is attached to the holding member and covers the short-circuit terminal;
the attachment member comprises a main portion in addition to the supporting portion and the waterproof sealing member;
the supporting portion extends rearward in the front-rear direction from the main portion; and
the structure functions as a waterproof branch connector.

3. The structure as recited in claim 2, wherein:
the holding member has a covered portion with a frame-like shape;
the holding member has a front end in the front-rear direction;
the covered portion forms the front end of the holding member;
the covered portion has an opening which is opened forward in the front-rear direction;
the attachment member has a cap portion; and
the cap portion covers the covered portion from an outside of the covered portion in a direction perpendicular to the front-rear direction and blocks the opening.

* * * * *